Aug. 21, 1962 R. L. CARBREY 3,050,587

BIPOLAR CLAMP FOR PULSE MODULATION SYSTEMS

Filed May 13, 1959 2 Sheets-Sheet 1

INVENTOR
R. L. CARBREY
BY R. B. Ardis
ATTORNEY

INVENTOR
R. L. CARBREY
BY R. B. Ardis
ATTORNEY

United States Patent Office 3,050,587
Patented Aug. 21, 1962

3,050,587
BIPOLAR CLAMP FOR PULSE MODULATION SYSTEMS

Robert L. Carbrey, Madison, N.J., assignor to Bell Telephone Laboratories, Incorporated, New York, N.Y., a corporation of New York Filed May 13, 1959, Ser. No. 812,855
14 Claims. (Cl. 179—15)

Figure 1:
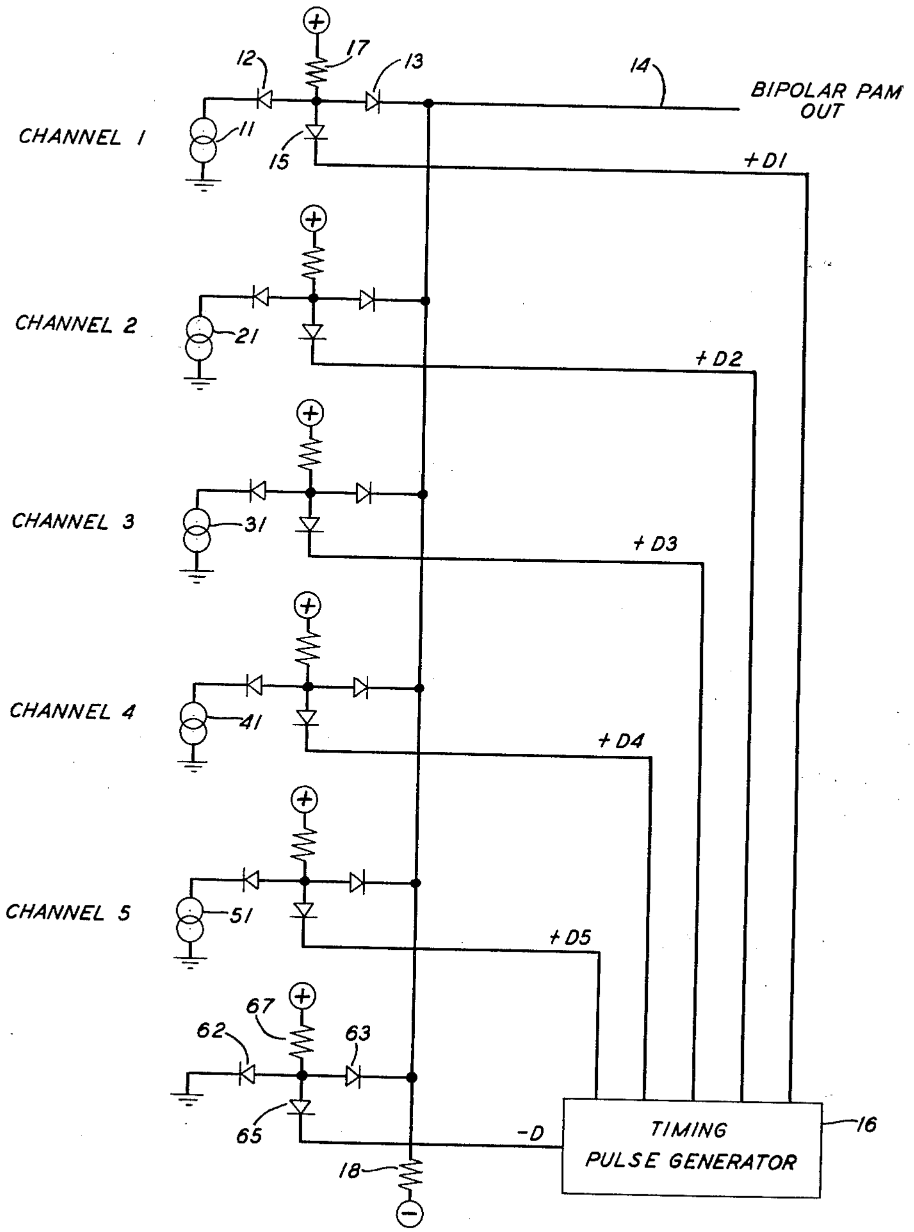

This invention relates generally to pulse type communication systems and more particularly, although in its broader aspects not exclusively, to systems in which pulse amplitude modulated signals from several channels are combined for transmission in time division multiplex.

A principal object of the invention is to eliminate the direct current component from a pulse amplitude modulated pulse train in as simple a manner as possible.

Another object is to avoid the crosstalk that might otherwise tend to occur in a multichannel pulse type time division multiplex communication system.

Still another object is to preserve impedance matches in a pulse type communication system both during and between pulsing intervals.

Pulse amplitude modulation (often referred to simply as PAM) pulse trains are frequently present in multichannel time division multiplex pulse time communication systems, either as the principal mode of signal transmission or as essential links in converting from the original signals to a more complex form of pulse train and back again. In pulse code modulation (ofter referred to as PCM) systems, for example, each channel is generally first sampled on a periodic basis and the individual signal amplitude samples are then converted into respective code groups of pulses and spaces. At the receiving end of a PCM system, the received code groups are usually reconverted to respective signal amplitude samples which are then used to regenerate the original signals in each channel. At both ends of such a PCM system, the succession of pulses of differing amplitude derived as an intermediate step in the encoding or decoding process forms a PAM pulse train.

The normal unipolar PAM pulse train, like most other modulated pulse trains, contains a direct current component of varying amplitude which is necessarily blocked by the transformers and coupling capacitors found in many transmission systems. Without this direct current component, the individual pulses in the PAM pulse train cease to be accurate amplitude samples of their respective signals and the utility of the PAM pulse train tends to be lost. The known arrangements for restoring direct current components to PCM pulse trains are not, however, readily applicable to PAM pulse trains.

Another difficulty encountered in the use of modulated pulse trains which is particularly severe in PAM pulse trains is that of interchannel crosstalk. Conventionally, guard spaces are provided between successive pulses in a pulse train to minimize crosstalk. When semiconductor devices are employed in the gate circuits used to form the pulse train, however, the phenomenon of minority carrier storage tends to aggravate the problem. If guard space times are lengthened to permit all minority carriers to dissipate, the information handling capacity of the system tends to be reduced.

Finally, a problem is frequently created in pulse modulation systems by impedance mismatches during either assigned pulse time slots or guard spaces. If system impedances are matched during pulse time slots, they are frequently mismatched during guard spaces or, alternatively, if system impedances are matched during guard spaces they aret frequently mismatched during pulse time slots. The effect of the mismatches can be reduced by accepting a lesser degree of mismatch at all times as a comprise, but such a solution is far from ideal.

The present invention provides an acceptable solution to all of the above problems simultaneously and does it, moreover, with a minimum of expense and circuit complexity. Broadly, the invention permits a conventional unipolar pulse train to be converted readily to a bipolar pulse train lacking any substantial direct current component without necessitating the use of complicated balanced gate circuits. It provides a low impedance path for the dissipation of minority carriers during all guard spaces and it leaves the system impedances matched during both guard spaces and assigned pulse time slots.

An important feature of the invention, in a pulse modulation system in which single-polarity pulses of direct current are supplied from one or more input channels to a single output bus, is a gate connecting the output bus during each guard interval to a reference potential intermediate in the voltage amplitude range of the signal pulses. In PAM circuitry, this feature converts the received pulses from a unipolar train in which the amplitude of each signal sample is measured by its departure from a reference at one edge of the amplitude range into a bipolar train in which the amplitude of each sample is measured by a combination of its polarity and its departure from a reference intermediate in the amplitude range. The resulting pulse train contains all of the information of a conventional unipolar train but possesses a considerably reduced direct current component, largely avoiding the transmission difficulties encountered in the past. In a number of preferred embodiments of the invention, the reference is the midpoint in the signal pulse amplitude range, eliminating the direct current component almost entirely.

In accordance with another important feature of the invention, the output bus upon which the signal amplitude samples are collected is returned to the reference potential during guard intervals through an impedance substantially less than that of the load into which pulses from the individual channels are fed. The load impedance is large enough to develop a reasonably large output voltage while still retaining small switching currents. Such a load impedance would, however, normally tend to increase minority carrier storage crosstalk by increasing carrier dissipation times. This feature of the present invention provides a low impedance dissipation path during guard intervals, permitting more rapid elimination of the storage effect.

In accordance with still another feature of the invention, the low impedance through which the output bus is returned to the reference potential during guard intervals is substantially equal to the output impedance of each individual signal input channel. Without the present invention, the above-mentioned load impedance would be shunted by the low output impedance of a signal input channel only during each assigned pulse time slot, leaving a much higher effective impedance during guard intervals. This feature of the invention provides the load with substantially the same effective shunting impedance during guard intervals as well as during pulse time slots, preserving good system impedance matches at all times.

Figure 2:
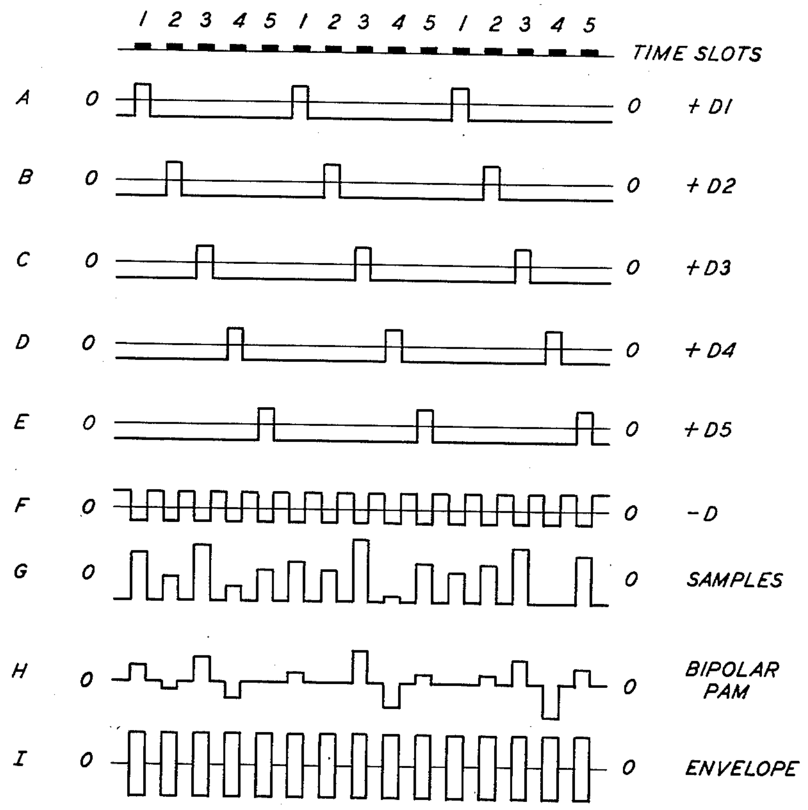

A more complete understanding of the invention and its features may be obtained from a study of the following detailed disclosure of one specific embodiment. In the drawings:

FIG. 1 illustrates a multichannel PAM transmitter embodying the various features of the invention; and FIG. 2 consists of a series of waveforms illustrating the operation of the embodiment of the invention shown in FIG. 1.

The embodiment of the invention illustrated in FIG. 1 samples five different input channels in succession, collects the resulting PAM pulses from each and converts them to bipolar form for transmission, PCM encoding, or other suitable disposition. In the first channel, generator 11 represents the source of a voice-frequency message wave and may, in fact, be the output end of an ordinary telephone line. The sampling gate is unbalanced with respect to ground for the sake of circuit simplicity and economy and takes the form of a pair of diodes 12 and 13 connected back to back between generator 11 and a common output bus 14. The other side of generator 11 is grounded. From the junction between diodes 12 and 13, a third diode 15, poled for easy current flow away from the junction point, is connected to the +D1 lead of a timing pulse generator 16. Timing pulse generator 16 may take the general form of the permanent or non-recurring portion of the pulse distributor shown in United States 2,984,706, issued May 16, 1961, to H. M. Jamison and R. L. Wilson, and produces a positive output on the +D1 lead during the first sampling interval or time slot, a positive output on the +D2 lead during the second sampling interval, and so on. At all other times, the various positively labeled timing pulse generator output leads are negative. The −D lead is negative during each sampling interval or time slot and positive during each intervening guard space. The junction point between diodes 12 and 13 is also connected to a positive potential source through a dropping resistor 17, while the side of diode 13 remote from the junction is returned to a negative potential source through a load resistor 18. Other unbalanced sampling gates may, of course, be used, but the one shown is particularly advantageous from the standpoint of simplicity, economy, and compactness.

The remaining four channels in the embodiment of the invention shown in FIG. 1 are similarly connected to output bus 14 through unbalanced diode sampling gates. These remaining channels are illustrated in FIG. 1 as generators 21, 31, 41, and 51, respectively. The sampling gates are the same as the one in the first channel, and all share the same load resistor 18. The number of channels combined by the system may, of course, be increased or decreased simply by increasing or decreasing the number of sampling gates and supplying the appropriate timing pulses from timing pulse generator 16.

The timing pulses supplied to the respective sampling gates are shown in lines A through E of FIG. 2. Thus, except during the first assigned pulse time slot, the potential on the +D1 lead of pulse generator 16 in FIG. 1 is negative and diode 15 in the first sampling gate is forward biased. As as result, the junction between diodes 12 and 13 is held at a negative potential, reverse biasing diodes 12 and 13 and blocking transmission from signal source 11 to common output bus 14. During the first time slot, however, the potential on the +D1 lead goes sufficiently positive to reverse bias diode 15. The junction between them becomes positive, forward biasing diodes 12 and 13. Current from signal source 11 can then pass through diodes 12 and 13 and load resistor 18 to the negative potential source, causing the potential of output bus 14 to shift in accordance with its magnitude. At the end of the positive-going time pulse on the +D1 lead, the sampling gate reverts to its original blocking condition. The operation of the other sampling gates is the same as the first, except that they transmit appropriate signal amplitude samples during the second, third, fourth, and fifth time slots, respectively.

The portion of the circuitry shown in FIG. 1 that has been described thus far is conventional and, in the absence of the present invention, the resulting succession of signal amplitude samples or PAM pulses on output bus 14 would resemble the type of waveform shown in line G of FIG. 2. The negative potential source would hold output bus 14 negative during the between-pulse guard spaces and output bus 14 would rise in potential from that reference by an amount dependent upon the appropriate signal amplitude during each sampling interval or assigned pulse time slot. As shown in line G, however, the resulting pulse train would still have a substantial direct current component which, although minimized by the negative potential to which load resistor 18 is returned, would vary in magnitude with the average of the signal amplitude samples. As explained previously, this direct current component would be blocked by any transformers or coupling capacitors encountered in the subsequent transmission apparatus and the individual pulses would tend to lose accuracy as amplitude samples of their respective signals. Minority charge carriers stored during the sampling intervals by the sampling gate diodes would, moreover, dissipate only through the relatively large impedance of load resistor 18. Each pulse would, therefore, tend to have a tail extending through the following guard space into the next time slot, creating relatively severe interchannel crosstalk. Finally, the impedance presented by the sampling circuitry to the subsequent apparatus would differ during pulse time slots from the value presented during guard space intervals. Each of the signal channels has an impedance much lower than that of load resistor 18. As a result, the impedance presented to the subsequent transmission apparatus would be relatively low during sampling intervals, since load resistor 18 would be shunted by a low impedance. During guard spaces, however, the impedance presented to subsequent apparatus in the system would be that of load resistor 18 itself.

In accordance with an important feature of the present invention, these problems of the prior art are solved by the use of an additional gate, which is shown in FIG. 1 as a substantial duplicate of the channel sampling gates. As shown, the additional gate includes a pair of back-to-back diodes 62 and 63 connected in series between output bus 14 and ground. Although it is not shown, a small impedance may be connected in series with diode 62, if desired, to approximate more closely the output impedance of the respective signal channels. From the junction between diodes 62 and 63, a diode 65 is connected to the −D lead of timing pulse generator 16 and a dropping resistor 67 is connected to a positive potential source.

In accordance with another important feature of the invention, the reference potential to which this additional gate is returned is substantially midway in the signal sample amplitude range of the system. In the embodiment illustrated in FIG. 1, this reference potential is ground, since in line G of FIG. 2 the old reference potential is as negative as the most positive excursion of the largest signal amplitude sample. With a different amplitude range, the added gate can be returned to either a new positive or a new negative reference potential, as required.

In accordance with still another feature of the invention, the timing wave supplied to diode 65 on the −D lead is opposite in phase to a composite of the timing waves on the various +D leads, like that shown in line F of FIG. 2. As shown, the −D lead is negative during each assigned pulse time slot, but positive during each guard space.

In operation, the additional gate used in the embodiment of the invention illustrated in FIG. 1 connects output bus 14 to ground through a low impedance during each guard space interval. During assigned pulse time slots, the negative potential on the −D lead forward biases diode 65, holding the junction between diodes 62 and 63 negative and back biasing each of them. The auxiliary gate featured by the invention thus blocks transmission and has no effect on the operation of the circuit during sampling intervals. During guard spaces, however, the positive potential on the −D lead of timing pulse generator 16 reverse biases diode 65, permitting the potential of the junction between diodes 62 and 63 to rise and diodes 62 and 63 to become forward biased. The type of output waveform shown in line H of FIG. 2 results. The absolute value of each signal amplitude sample remains unchanged, but the PAM pulse train is bipolar instead of unipolar in form. The envelope of the type of PAM pulse train generated on output bus 14 is illustrated in line I of FIG. 2.

The direct current component of the bipolar PAM pulse train made possible so simply by the present invention is virtually nonexistent. The pulse train may, therefore, be passed through such transmission apparatus as transformers and coupling capacitors without difficulty and with no substantial distortion. Output bus 14 is, furthermore, returned to ground through a low impedance during guard spaces, permitting stored minority charge carriers to dissipate rapidly and avoiding troublesome interchannel crosstalk. Finally, system impedances remain matched during guard spaces as well as during pulse time slots, since load resistor 18 remains shunted by substantially the same low impedance at all times.

It is to be understood that the arrangement which has been described is illustrative of the application of the principles of the invention. Numerous other embodiments may be devised by those skilled in the art without departing from the spirit and scope of the invention.

What is claimed is:

1. In a pulse modulation system, a signal pulse output bus, at least one source of unipolar pulses of direct current of variable amplitude and like polarity, said pulses having amplitudes which vary within a predetermined range, means to supply pulses from said source to said output bus during predetermined spaced time intervals, and means to convert said pulses into bipolar pulses which comprises means to connect said output bus to a predetermined reference potential intermediate in said amplitude range between each of said predetermined time intervals, and means to disconnect said output bus from said predetermined reference potential during each of said predetermined time intervals.

2. In a pulse modulation system, a signal pulse output bus, a plurality of signal input channels, a like plurality of sources of unipolar pulses of direct current of variable amplitude and like polarity, said pulses having amplitudes which vary within a predetermined range, means to supply the pulses from each of said sources to a corresponding one of said input channels, switching means to supply pulses from respective ones of said input channels to said output bus during predetermined spaced time intervals, and means to convert said pulses into bipolar pulses which comprises means to connect said output bus to a predetermined reference potential intermediate in said amplitude range between each of said predetermined intervals and means to disconnect said output bus from said predetermined reference potential during each of said predetermined intervals.

3. In a pulse modulation system, a signal pulse output bus, at least one source of unipolar pulses of direct current of variable amplitude and like polarity, means to supply pulses from said source to said output bus during predetermined spaced time intervals, and means to convert said pulses into bipolar pulses which comprises means to connect said output bus through a load impedance to one predetermined reference potential during said predetermined time intervals, means to connect said output bus through an impedance less than said load impedance to a different predetermined reference potential between each of said predetermined time intervals, and means to disconnect said output bus from said lesser impedance and said different predetermined reference potential during each of said predetermined time intervals.

4. In a pulse modulation system, a signal pulse output bus, a plurality of signal input channels, switching means to supply unipolar pulses of direct current of variable amplitude and like polarity from respective ones of said input channels to said output bus during predetermined spaced time intervals, and means to convert said unipolar pulses into bipolar pulses which comprises a load impedance, means to connect said output bus through said load impedance to one predetermined reference potential during said predetermined time intervals, an impedance at least several times smaller than said load impedance, means to connect said output bus through said smaller impedance to a different predetermined reference potential between each of said predetermined time intervals, and means to disconnect said output bus from said smaller impedance and said different predetermined reference potential during each of said predetermined time intervals.

5. In a pulse modulation system, a signal pulse output bus, at least one signal input channel, at least one source of signals of varying amplitude, means to supply the signals from said source to said input channel, a sampling gate connected in tandem transmission relation between said input channel and said output bus, means to enable said sampling gate during predetermined spaced time intervals, a clamping gate substantially identical to said sampling gate returned from said output bus to a predetermined reference potential substantially midway in the amplitude range of the signals carried by said input channel, means to enable said clamping gate between each of said predetermined time intervals, and means to disenable said clamping gate during each of said predetermined time intervals.

6. In a pulse modulation system, a signal pulse output bus, a plurality of signal input channels, a like plurality of sources of signals of varying amplitude, means to supply the signals from each of said sources to a corresponding one of said input channels, a plurality of sampling gates each connected in tandem transmission relation between a respective one of said input channels and said output bus, means to enable said sampling gates in sequence during successive ones of predetermined spaced time intervals, a clamping gate returned from said output bus to a predetermined reference potential substantially midway in the amplitude range of the signals carried by said input channels, means to enable said clamping gate between each of said predetermined time intervals, and means to disenable said clamping gate during each of said predetermined time intervals.

7. In a pulse modulation system, a signal pulse output bus, at least one signal input channel having a predetermined output impedance, a sampling gate connected in tandem transmission relation between said input channel and said output bus, a load having an impedance at least several times larger than said input channel output impedance connected between said output bus and a first reference potential, means to enable said sampling gate during predetermined spaced time intervals, an auxiliary impedance substantially equal to said input channel output impedance, a clamping gate connecting said output bus through said auxiliary impedance to a second reference potential, means to enable transmission of said second reference potential through said clamping gate between each of said predetermined time intervals, and means to preclude transmission of said second reference potential through said clamping gate during each of said predetermined time intervals.

8. In a pulse modulation system, a signal pulse output bus, a plurality of signal input channels each having substantially the same predetermined output impedance, all of said input channels being adapted to carry signals varying in amplitude within a predetermined range, a plurality of sampling gates each connected in tandem transmission relation between a respective one of said input channels and said output bus, a load having an impedance at least several times larger than said input channel output impedance connected between said output bus and a first reference potential, means to enable said sampling gates in sequence during successive ones of predtermined spaced time intervals, an auxiliary impedance substantially equal to said input channel output impedance, a clamping gate connecting said output bus through said auxiliary impedance to a second reference potential, said second reference potential being removed from said first reference potential by substantially half of said predetermined amplitude range, means to complete a path for electrical conduction through said clamping gate between each of said predetermined time intervals, and means to break said path for electrical conduction through said clamping gate during each of said predetermined time intervals.

9. In a pulse modulation system, a signal pulse output bus, at least one signal input channel, a sampling gate connected in tandem transmission relation between said input channel and said output bus, a load impedance connected between said output bus and a first reference potential, means to enable said sampling gate during predetermined spaced time intervals, an auxiliary impedance at least several times less than said load impedance, a clamping gate connecting said output bus through said auxiliary impedance to a second reference potential, a source of control signals for said clamping gate, and an electrical connection from said source to said clamping gate such that said clamping gate will transmit said second reference potential between each of said predetermined time intervals and will not transmit said second reference potential during each of said predetermined time intervals.

10. A combination in accordance with claim 9 which includes at least one source of signals varying in amplitude within a predetermined range and means to supply the signals from said source to said input channel and in which said first reference potential is at one edge of said predetermined range and said second reference potential is intermediate in said predetermined range.

11. A combination in accordance with claim 9 which includes at least one source of signals varying in amplitude within a predetermined range and means to supply the signals from said source to said input channel and in which said first reference potential is at one edge of said predetermined range and said second reference potential is at substantially the midpoint of said predetermined range.

12. In a pulse modulation system, a signal pulse output bus, a plurality of signal input channels, a plurality of sampling gates each connected in tandem transmission relation between a respective one of said input channels and said output bus, a load impedance connected between said output bus and a first reference potential, means to enable said sampling gates in sequence during successive ones of predetermined spaced time intervals, an auxiliary impedance at least several times less than said load impedance, a clamping gate substantially identical to said sampling gates connecting said output bus through said auxiliary impedance to a second reference potential, and a source of control signals for said clamping gate, and an electrical connection from said source to said clamping gate such that said control signals induce a low resistance condition of said clamping gate between each of said predetermined time intervals and induce a high resistance condition of said clamping gate during each of said predetermined time intervals.

13. A combination in accordance with claim 12 which includes a plurality of sources of signals varying in amplitude within a predetermined range and means to supply the signals from each of said sources to a corresponding one of said input channels and in which said first reference potential is at one edge of said predetermined range and said second reference potential is intermediate in said predetermined range.

14. A combination in accordance with claim 12 which includes a plurality of sources of signals varying in amplitude within a predetermined range and means to supply the signals from each of said sources to a corresponding one of said input channels and in which said first reference potential is at one edge of said predetermined range and said second reference potential is at substantially the midpoint of said predetermined range.

References Cited in the file of this patent

UNITED STATES PATENTS

| | | |
|---|---|---|
| 2,535,303 | Lewis | Dec. 26, 1950 |
| 2,548,796 | Houghton | Apr. 10, 1951 |
| 2,576,026 | Meacham | Nov. 20, 1951 |
| 2,602,918 | Kretzmer | July 8, 1952 |
| 2,657,318 | Rack | Oct. 27, 1953 |
| 2,782,303 | Goldberg | Feb. 19, 1957 |
| 2,851,617 | Walker | Sept. 9, 1958 |
| 2,870,259 | Norris | Jan. 20, 1959 |

FOREIGN PATENTS

| | | |
|---|---|---|
| 725,396 | Great Britain | Mar. 2, 1955 |